(12) United States Patent
Bernhard

(10) Patent No.: US 7,748,251 B2
(45) Date of Patent: Jul. 6, 2010

(54) CIRCUIT CONFIGURATION AND METHOD FOR ASCERTAINING TILT ERRORS IN CONNECTION WITH A POSITION-MEASURING DEVICE

(75) Inventor: Robert Bernhard, Garching a.d. Alz (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 291 days.

(21) Appl. No.: 11/821,292

(22) Filed: Jun. 22, 2007

(65) Prior Publication Data
US 2008/0011043 A1 Jan. 17, 2008

(30) Foreign Application Priority Data
Jun. 28, 2006 (DE) ................ 10 2006 029 650

(51) Int. Cl.
*G01B 3/30* (2006.01)
(52) U.S. Cl. ...................................... 73/1.79
(58) Field of Classification Search ............ 73/1.79
See application file for complete search history.

(56) References Cited
U.S. PATENT DOCUMENTS
2003/0016369 A1 * 1/2003 Benner et al. ............ 356/616

FOREIGN PATENT DOCUMENTS
EP 0 555 507 8/1993

* cited by examiner

*Primary Examiner*—Hezron Williams
*Assistant Examiner*—Alex Devito
(74) *Attorney, Agent, or Firm*—Kenyon & Kenyon LLP

(57) ABSTRACT

In a circuit configuration for ascertaining tilt errors in connection with a position-measuring device, the position-measuring device includes at least one incremental track on a measuring graduation that is able to be read by a scanner, which is movable relative to the measuring graduation in a measuring direction, and the scanner is guided along the measuring graduation and the scanner is rotated with respect to the measuring graduation by an angle of misalignment that is changeable during the relative movement. Perpendicular to the measuring direction, the scanner has a first scanning region and a second scanning region, whereby upon reading the at least one incremental track, at least one first position signal is able to be generated by the first scanning region and at least one second position signal is able to be generated by the second scanning region. The at least one first position signal and the at least one second position signal are supplied to an arithmetic unit in which, from the at least one first position signal and from the at least one second position signal, at least one tilt-error signal is able to be generated by addition and/or subtraction operations, the amplitude of the tilt-error signal being determined by an angle of tilt and being a measure for the angle of misalignment.

24 Claims, 6 Drawing Sheets

CIRCUIT CONFIGURATION AND METHOD FOR ASCERTAINING TILT ERRORS IN CONNECTION WITH A POSITION-MEASURING DEVICE

CROSS-REFERENCE TO RELATED APPLICATIONS

The present application claims priority to Application No. 10 2006 029 650.8, filed in the Federal Republic of Germany on Jun. 28, 2006, which is expressly incorporated herein in its entirety by reference thereto.

FIELD OF THE INVENTION

The present invention relates to a circuit configuration for ascertaining tilt errors in connection with a position-measuring device. Such a circuit configuration makes it possible to ascertain guiding errors which occur between a measuring graduation and a scanner of the position-measuring device. The present invention further relates to a method for ascertaining tilt errors in connection with a position-measuring device.

BACKGROUND INFORMATION

Certain position-measuring devices are described in a multitude of documents. They are used primarily for determining relative displacements or the absolute position of machine parts, e.g., in the case of machine tools or measuring machines.

Position-measuring devices of this kind include a measuring graduation on which one or more scale-division tracks are applied, and a scanner which scans the scale-division tracks and converts changes of path or angle into electrical signals. In the case of linear measuring instruments, the measuring graduation preferably takes the form of a scale. If a linear measuring instrument is used for measuring relative machine movements, the scale may be mounted in stationary fashion on the machine, for example, while the scanner is secured to a movable machine part, for instance, a tool carriage, whose movement relative to the machine is to be measured. During a traversing movement of the tool carriage, the scanner moves in a scanning plane in the measuring direction parallel to the scale-division tracks that are disposed on the scale and are in a scale plane, and scans the scale-division tracks. In so doing, position signals are obtained which indicate the position of the scanner relative to the scale.

The measurements of relative machine movements may be incorrect if the machine guideways are inexact, particularly when the scanner in the scanning plane executes a tilting motion relative to the scale plane while the scanner is moved along the scale. Such tilting motions can come about first of all because the guidance of the tool carriage is imprecise, and secondly, because over the measuring length, the scale has deformations transversely to the measuring direction.

European Patent No. 0 555 507 describes a displacement measuring device in which, perpendicular to the measuring direction, the scanner has a plurality of scanning regions which scan either one scale-division track in several measuring tracks, or a plurality of parallel scale-division tracks, simultaneously. The scale-division tracks are preferably incremental tracks. The position signals generated by the plurality of scanning regions contain information about the extent of the angular misalignment of the scanner relative to the scale.

SUMMARY

Example embodiments of the present invention provide a circuit configuration by which it is possible to ascertain the angular misalignment of the scanner relative to the scale.

Example embodiments of the present invention provide a method for ascertaining the angular misalignment of the scanner relative to the scale.

A circuit configuration is described below for ascertaining tilt errors in connection with a position-measuring device, in which the position-measuring device has at least one incremental track on a measuring graduation that is able to be read by a scanner which is movable relative to the measuring graduation in a measuring direction, in which the scanner is guided along the measuring graduation and the scanner is rotated with respect to the measuring graduation by an angle of misalignment that is changeable during the relative movement. Perpendicular to the measuring direction, the scanner has a first scanning region and a second scanning region, whereby upon reading the at least one incremental track, at least one first position signal is able to be generated by the first scanning region and at least one second position signal is able to be generated by the second scanning region. In an arithmetic unit, at least one tilt-error signal is generated from the at least one first position signal and the at least one second position signal by addition and/or subtraction operations, the amplitude of the tilt-error signal being determined by an angle of tilt that is a measure for the angle of misalignment.

According to an example embodiment of the present invention, a circuit configuration for ascertaining a tilt error in connection with a position-measuring device having at least one incremental track on a measuring graduation readable by a scanner, the scanner movable relative to the measuring graduation in a measuring direction, the scanner guidable along the measuring graduation, the scanner rotated with respect to the measuring graduation by an angle of misalignment that is changeable during the relative movement, the scanner including a first scanning region and a second scanning region perpendicular to the measuring direction, upon reading the at least one incremental track, at least one first position signal generatable by the first scanning region, and at least one second position signal generatable by the second scanning region, includes: an arithmetic unit to which the at least one first position signal and the at least one second position signal are suppliable, the arithmetic unit configured to generate, by at least one of (a) addition and (b) subtraction-operations, from the at least one first position signal and from the at least one second position signal at least one tilt-error signal having an amplitude based on an angle of tilt that is a measure of the angle of misalignment.

The arithmetic unit may include at least one differential amplifier.

The circuit configuration may include an evaluation unit configured to ascertain a tilt-error value that corresponds to the angle of misalignment from the at least one tilt-error signal.

The arithmetic unit may include a first differential amplifier configured to form a first tilt-error signal and a second differential amplifier configured to form a second tilt-error signal.

The first tilt-error signal and the second tilt-error signal may have a phase shift of 90°, and the evaluation unit may be configured to ascertain an absolute value of a complex position signal formed from the first tilt-error signal and the second tilt-error signal.

The first tilt-error signal may be a function of a sine of the angle of tilt, and the second tilt-error signal may be a function of a cosine of the angle of tilt.

The evaluation unit may be configured to ascertain the tilt-error value as a quotient of the first tilt-error signal and the second tilt-error signal.

The second differential amplifier may be configured to generate a third tilt-error signal having a phase shift of 180° with respect to the second tilt-error signal.

The evaluation unit may include a counter unit, a comparator and a trigger unit. The counter unit may have an output corresponding to the tilt-error value, a counting direction of the counter unit may be determined in accordance with an output of the comparator, the first tilt-error signal and a reference signal may be applied to inputs of the comparator, the trigger unit may be configured to generate, at one of (a) a maximum and (b) a minimum of the first tilt-error signal, a counting pulse for the counter unit, in accordance with a counter reading of the counter unit, and the reference signal may be variable such that the reference signal and an amplitude of the first tilt-error signal come close to each other.

The evaluation unit may include a voltage divider, having a plurality of taps, and a switch element, the second tilt-error signal and the third tilt-error signal may be applied to outer terminals of the voltage divider, one of the taps may be switchable by the switch element as a reference signal to the comparator, and the counter reading of the counter unit may be supplied to the switch element for selection of the tap.

The trigger unit may include a third differential amplifier and a zero-crossing detector. The third differential amplifier may be configured to generate, from at least one first position signal and at least one second position signal, a trigger signal that is out of phase by 90° compared to the first tilt-error signal, and the trigger signal may be supplied to the zero-crossing detector that, at one of (a) a positive and (b) a negative zero crossing of the trigger signal, is configured to output a counting pulse to the counter unit.

According to an example embodiment of the present invention, a position-measurement device includes: a measuring graduation including at least one incremental track; a scanner configured to read the incremental track, the scanner movable relative to the measuring graduation in a measurement direction, the scanner being guided along the measuring graduation and being rotated with respect to the measuring graduation by an angle of misalignment that is changeable during the relative movement, the scanner having a first scanning region and a second scanning region perpendicular to the measuring direction, upon reading the at least one incremental track, at least one first position signal generatable by the first scanning region and at least one second position signal generatable by the second scanning region; and a circuit configuration configured to ascertain a tilt error, the circuit configuration including an arithmetic unit, the at least one first position signal and the at least one second position signal supplied to the arithmetic unit, the arithmetic unit configured to generate, from the at least one first position signal and from the at least one second position signal, by at least one of (a) addition and (b) subtraction operations at least one tilt-error signal having an amplitude determined in accordance with an angle of tilt that is a measure of the angle of misalignment.

According to an example embodiment of the present invention, a method for ascertaining a tilt error in connection with a position-measuring device having at least one incremental track on a measuring graduation that is readable by a scanner, which is movable relative to the measuring graduation in a measuring direction, the scanner guidable along the measuring graduation, the scanner rotated with respect to the measuring graduation by an angle of misalignment that is changeable during the relative movement, the scanner having a first scanning region and a second scanning region perpendicular to the measuring direction, includes: upon reading the at least one incremental track, generating at least one first position signal by the first scanning region and generating at least one second position signal by the second scanning region; and generating, from the at least one first position signal and the at least one second position signal, at least one tilt-error signal by at least one of (a) addition and (b) subtraction operations in an arithmetic unit, an amplitude of the tilt-error signal determined by an angle of tilt that is a measure of the angle of misalignment.

The at least one tilt-error signal may be generated by at least one differential amplifier.

The method may include ascertaining, in an evaluation unit, a tilt-error value, from the at least one tilt-error signal, that corresponds to the angle of misalignment.

The tilt-error signal generating step may include generating, in the arithmetic unit, a first tilt-error signal by a first differential amplifier and a second tilt-error signal by a second differential amplifier.

The first tilt-error signal and the second tilt-error signal may have a phase shift of 90°, and the method may include ascertaining, in the evaluation unit, an absolute value of a complex position signal formed from the first tilt-error signal and the second tilt-error signal as a tilt-error value.

The first tilt-error signal may be a function of a sine of the angle of tilt, the second tilt-error signal may be a function of a cosine of the angle of tilt, and the method may include forming, in the evaluation unit, a quotient of the first tilt-error signal and the second tilt-error signal for ascertaining a tilt-error value.

The method may include: establishing, in a comparison of the first tilt-error signal to a reference signal in a comparator, a counting direction of a counter unit, a counter reading of the counter unit being the tilt-error value; sending a counting pulse to the counter unit by a trigger unit at one of (a) a maximum and (b) minimum of the first tilt-error signal; and changing the reference signal, in accordance with the counter reading of the counter unit, such that the reference signal and an amplitude of the first tilt-error signal come close to each other.

The method may include: forming, in the arithmetic unit, a third tilt-error signal having a phase shift of 180° relative to the second tilt-error signal; applying, in the evaluation unit, the second tilt-error signal and the third tilt-error signal to outer terminals of a voltage divider having a plurality of taps, one of the taps being switchable by a switch element as a reference signal to the comparator; and supplying the counter reading of the counter unit to the switch element for selection of the tap.

The method may include: generating a trigger signal, by a third differential amplifier in the trigger unit, from at least one first position signal and at least one second position signal, the trigger signal out of phase by 90° with respect to the first tilt-error signal; and supplying the trigger signal to a zero-crossing detector that, at one of (a) a positive and (b) a negative zero crossing of the trigger signal, outputs a counting pulse to the counter unit.

Further features and aspects of example embodiments of the present invention are described in more detail below with reference to the appended Figures.

DETAILED DESCRIPTION

Figure 1A:
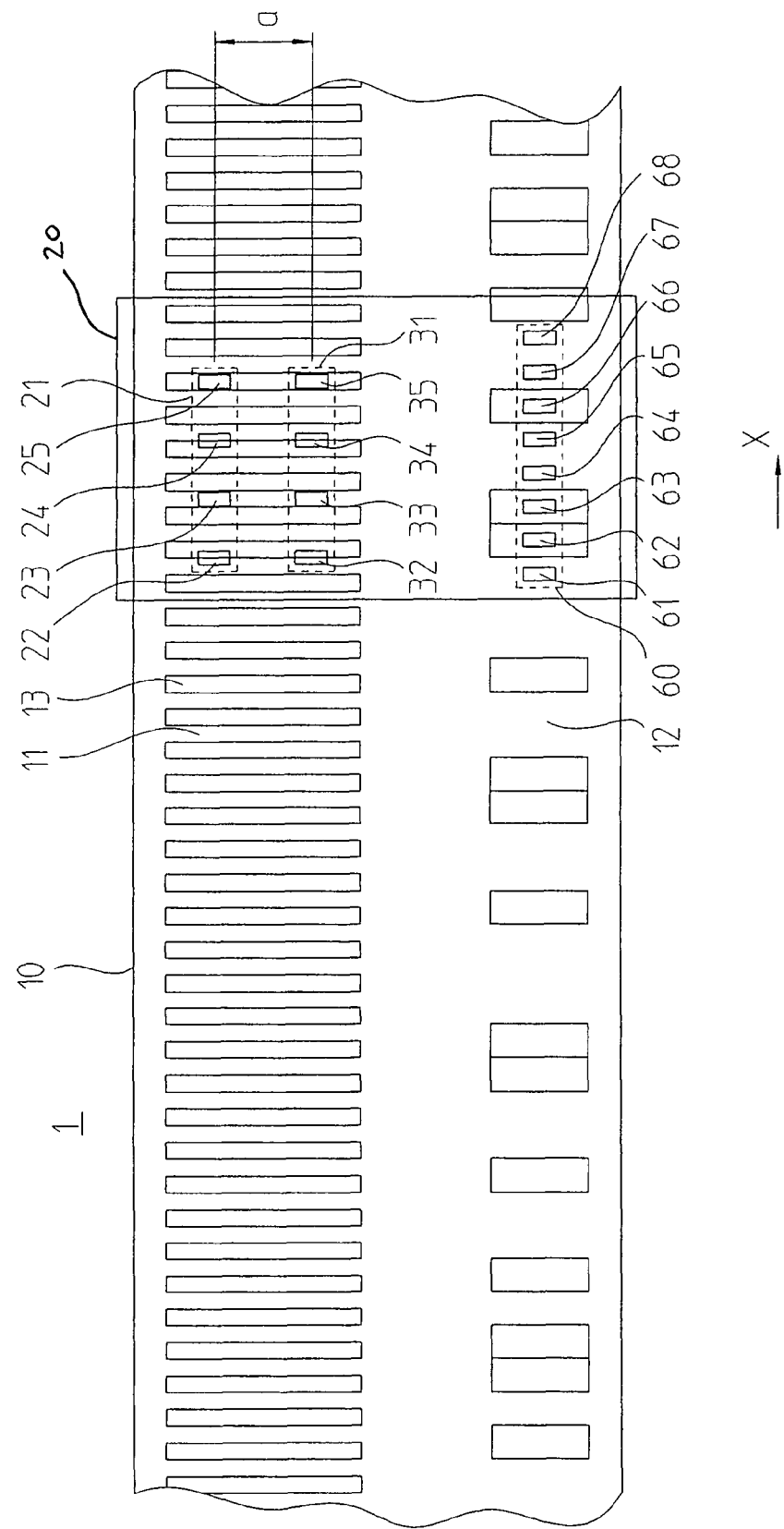
FIG. 1a schematically illustrates an ideal arrangement of a measuring graduation and a scanner of a position-measuring device according to an example embodiment of the present invention.

Components described below and illustrated throughout the Figures having the same or similar function are provided with the same reference characters. For clarity, a repeated detailed description of these elements is omitted.

As a position-measuring device 1, FIG. 1a illustrates a linear measuring device 1, that is, the relevant components of a linear measuring device 1—e.g., a measuring graduation in the form of a scale 10 and a scanner 20. Scale 10 includes an incremental track 11 and an absolute track 12. Grating lines 13 of incremental track 11 extend transversely to measuring direction X and have an equal distance to one another. The absolute position values of absolute track 12 are implemented as serial code. Codes of this kind are also referred to as pseudo random codes (PRC). Absolute track 12 may also be coded in parallel, thus may be made up of a plurality of scale-division tracks extending in parallel in measuring direction X.

Further examples for linear measuring devices 1 are described in European Patent No. 0 555 507, which is expressly incorporated herein in its entirety by reference thereto, e.g., FIGS. 1, 3, 4 and 5.

Scanner 20 is guided parallel to scale 10. To scan incremental track 11, the scanner has a first scanning region 21 having scanning fields 22, 23, 24, 25, as well as a second scanning region 31 having scanning fields 32, 33, 34, 35. First scanning region 21 and second scanning region 31 are disposed perpendicular to measuring direction X and have a distance a to one another.

Given ideal guidance of scanner 20 with respect to scale 10, scanning fields 22, 23, 24, 25 generate first position signals 40, 41, 42, 43 which are out of phase with each other by in each case 90°. Expressed differently, phase angles of 0°, 90°, 180° and 270° may be assigned to first position signals 40, 41, 42, 43. Scanning fields 32, 33, 34, 35 generate second position signals 50, 51, 52, 53 corresponding thereto.

Figure 1B:
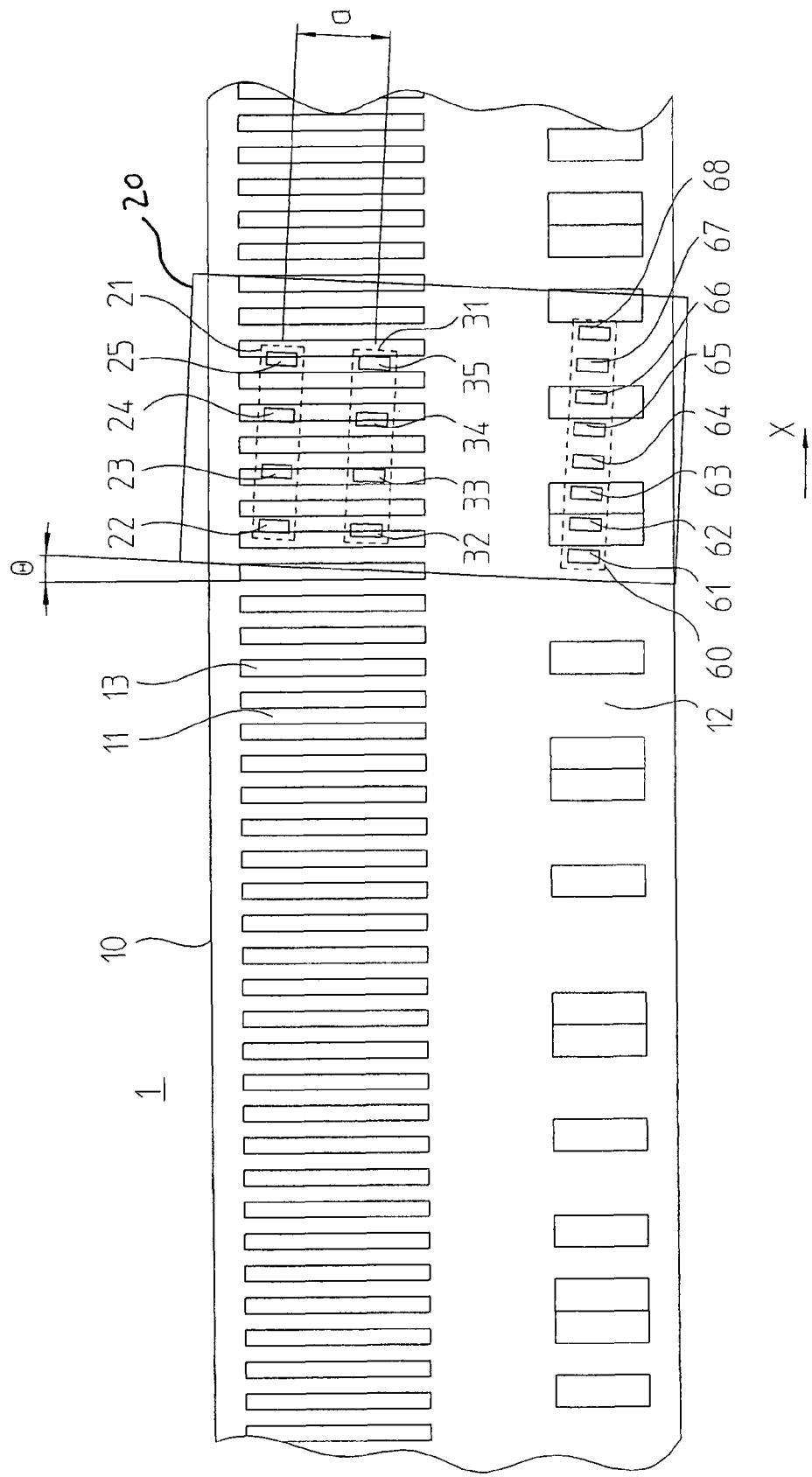
FIG. 1b schematically illustrates an arrangement of a measuring graduation and a scanner of a position measuring device, in which the scanner exhibits an angular misalignment relative to the measuring graduation.

To scan absolute track 12, a third scanning region 60 is used having scanning fields 61 to 68 which read the code segments of absolute track 12, e.g., in a conventional manner. In practice, the code words read from absolute track 12 are used for ascertaining a coarse position whose accuracy is improved by evaluating the fine position resulting from position signals obtained from incremental track 11. In this context, it is important that one position on incremental track 11 is able to be assigned uniquely to each code word of absolute track 12. In this regard, one also speaks of a code connection. As long as the guidance of scanner 20 relative to scale 10 is ideal as illustrated in FIG. 1a, the code connection is executable without difficulty. In practice, however, usually scanner 20 is rotated by an angle of misalignment $\Theta$ relative to scale 10, as illustrated in FIG. 1b. Angle of misalignment $\Theta$ is also referred to as moiré error. For example, the reasons for this may be, first of all, inaccuracies in the mounting of scanner 20, which produce an angle of misalignment $\Theta$ that is constant over the measuring length. Secondly, however, deformations of scale 10 transversely to measuring direction X or guiding errors of scanner 20 relative to scale 10 lead to a continuous change of angle of misalignment $\Theta$ over the measuring length. To nonetheless permit a correct code connection, it is necessary to continuously ascertain angle of misalignment $\Theta$ during the movement of scanner 20 relative to scale 10.

Figure 2:
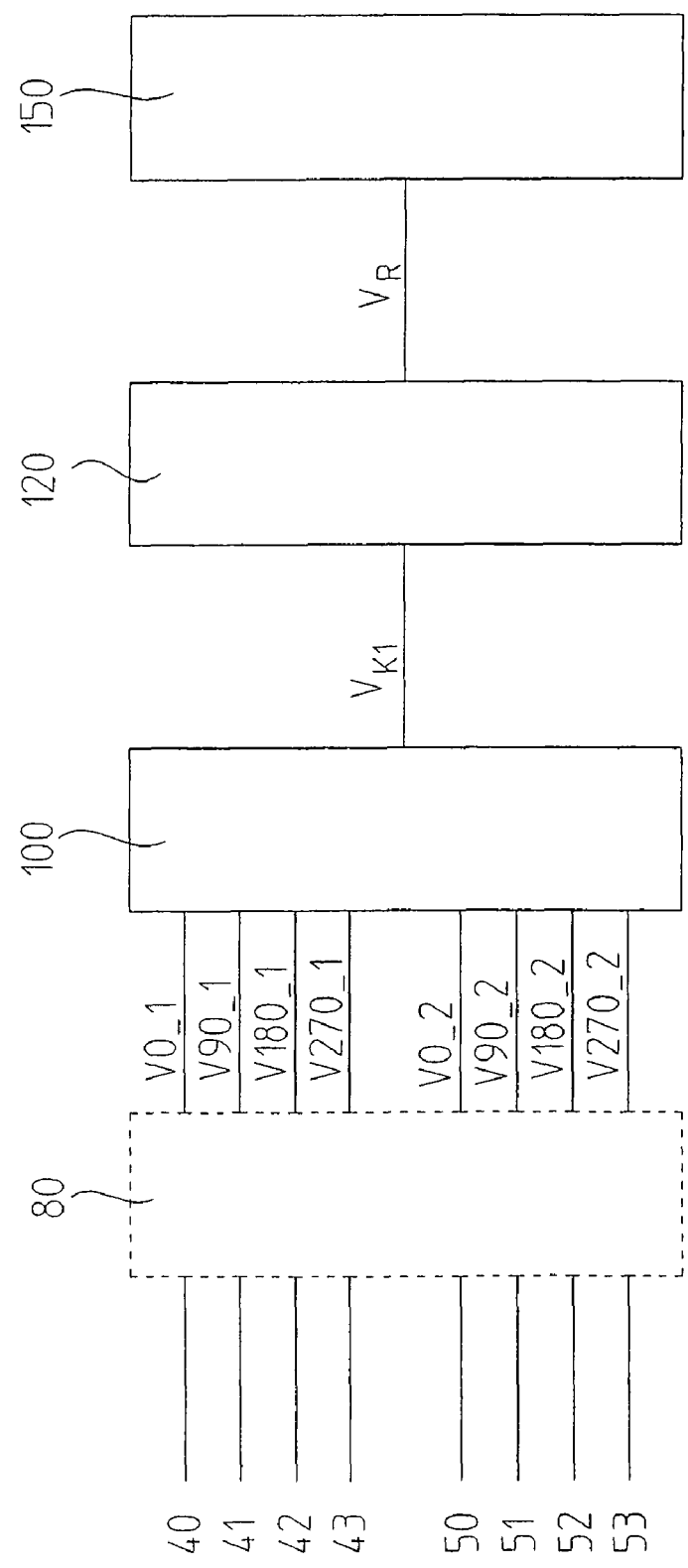
FIG. 2 is a block diagram of a circuit configuration for ascertaining a tilt-error value.

FIG. 2 is a block diagram of a circuit configuration for ascertaining a tilt-error value which is a measure for angle of misalignment $\Theta$. First position signals 40, 41, 42, 43 and second position signals 50, 51, 52, 53, which are obtained during the scanning of the scale of linear measuring device 1, described with reference to FIG. 1a and FIG. 1b, respectively, by scanner 20 form the input signals of the circuit configuration. Depending upon which scanning principle is used in the position-measuring device, the position signals may be current signals or voltage signals. If, as conventional in the case of optical position-measuring devices, they are current signals, they are first converted into voltage signals in an optionally provided current/voltage transformer unit 80, and then supplied to an arithmetic unit 100. In the further description, the voltage signals resulting from first position signals 40, 41, 42, 43 are denoted corresponding to their phase angle as first 0°-signal V0_1, first 90°-signal V90_1, first 180°-signal V180_1 and first 270°-signal V270_1. Analogous thereto, the voltage signals resulting from second position signals 50, 51, 52, 53 are denoted as second 0°-signal V0_2, second 90°-signal V90_2, second 180°-signal V180_2 and second 270°-signal V270_2.

First position signals V0_1, V90_1, V180_1, V270_1 and second position signals V0_2, V90_2, V180_2, V270_2 are largely sinusoidal and, as a result of the symmetrical arrangement, have the same signal amplitude VAC and exhibit an identical DC voltage component (offset voltage) VDC. The location-dependence of the position signals is determined by a phase value $\alpha$ which, between two grating lines 13 of scanned incremental track 11, runs through phase values of 0° to 360°. Since the grating period, thus the spacing between the grating lines of incremental track 11 is known, the phase values are able to be converted into distance values. If, as a result of guiding errors, an angular misalignment of scanner 20 in relation to the scale occurs, a phase shift comes about between first position signals V0_1, V90_1, V180_1, V270_1 and second position signals V0_2, V90_2, V180_2, V270_2 in the form of an angle of tilt $\phi$. Based on the known distance a between first scanning region 21 and second scanning region 31, angle of misalignment $\Theta$ between scanner 20 and scale 10 may be calculated with the aid of angle of tilt $\phi$.

For simplification, for the following observations it is assumed that angle of tilt $\phi$ has an effect by one half each on first position signals V0_1, V90_1, V180_1, V270_1 and second position signals V0_2, V90_2, V180_2, V270_2. This means first position signals V0_1, V90_1, V180_1, V270_1 undergo a phase shift by $+\phi/2$, and second position signals V0_2, V90_2, V180_2, V270_2 undergo a phase shift by $-\phi/2$.

First position signals V0_1, V90_1, V180_1, V270_1 may therefore be described by the following equations:

$$V0\_1 = V_{AC} \cdot \sin\left(\alpha + \frac{\varphi}{2}\right) + V_{DC} \quad \text{(Equation 1.1)}$$

$$V90\_1 = -V_{AC} \cdot \cos\left(\alpha + \frac{\varphi}{2}\right) + V_{DC} \quad \text{(Equation 1.2)}$$

$$V180\_1 = -V_{AC} \cdot \sin\left(\alpha + \frac{\varphi}{2}\right) + V_{DC} \quad \text{(Equation 1.3)}$$

$$V270\_1 = V_{AC} \cdot \cos\left(\alpha + \frac{\varphi}{2}\right) + V_{DC} \quad \text{(Equation 1.4)}$$

Analogous thereto, second position signals V0_2, V90_2, V180_2, V270_2 may be expressed by the following equations:

$$V0\_2 = V_{AC} \cdot \sin\left(\alpha - \frac{\varphi}{2}\right) + V_{DC} \quad \text{(Equation 2.1)}$$

$$V90\_2 = -V_{AC} \cdot \cos\left(\alpha - \frac{\varphi}{2}\right) + V_{DC} \quad \text{(Equation 2.2)}$$

$$V180\_2 = -V_{AC} \cdot \sin\left(\alpha - \frac{\varphi}{2}\right) + V_{DC} \quad \text{(Equation 2.3)}$$

$$V270\_2 = V_{AC} \cdot \cos\left(\alpha - \frac{\varphi}{2}\right) + V_{DC} \quad \text{(Equation 2.4)}$$

In arithmetic unit 100, the four first position signals V0_1, V90_1, V180_1, V270_1 and the four second position signals V0_2, V90_2, V180_2, V270_2 are processed to form a first tilt-error signal VK1 whose amplitude is determined substantially by the magnitude of angle of tilt $\phi$.

For example, arithmetic unit 100 may include a summing amplifier and/or differential amplifier, which is arranged such that it adds at least one of first position signals V0_1, V90_1, V180_1, V270_1 and one of second position signals V0_2, V90_2, V180_2, V270_2 or forms their difference. The sum or the difference of two sinusoidal signals having the same amplitude and frequency always yields a sinusoidal signal again, which has the same frequency as the original signals, but whose amplitude is a function of the phase angle of the original signals. Thus, if the addition of two signals having the same phase angle leads to a doubling of the output signal, if the difference is formed, the signals are canceled, since the amplitude of the output signal becomes 0.

The output signal of arithmetic unit 100 is therefore again sinusoidal and has the same frequency as the input signals. On the other hand, the amplitude of the output signal is dependent both on the phase angle of the input signals without influence of a guiding error, and on the value of angle of tilt $\phi$. This correlation shall be shown using two examples.

Example 1

Figure 3A:
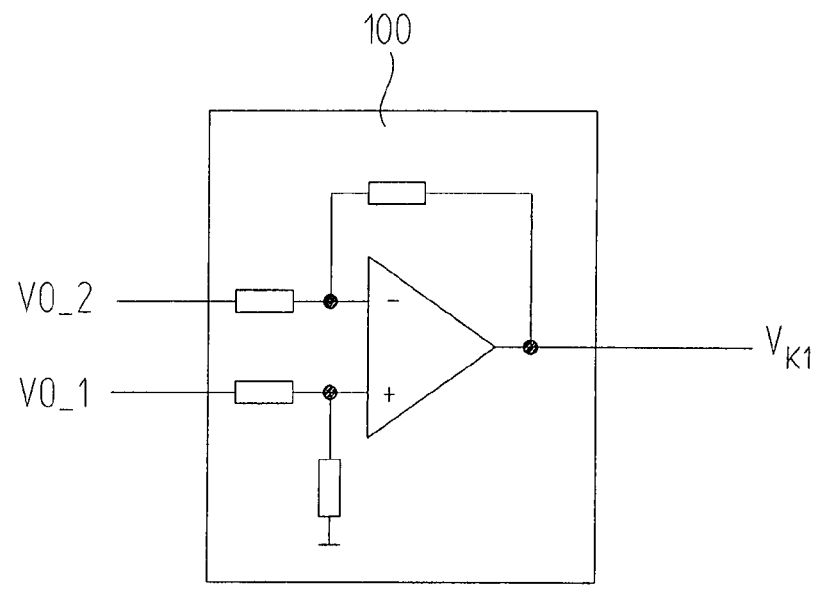
FIG. 3a illustrates an example embodiment of an arithmetic unit.

A variant for the arrangement of arithmetic unit 100 for example 1 is illustrated in FIG. 3a. It is a differential-amplifier circuit that should be familiar to one skilled in the art, which is suitable for forming the difference between two input signals.

First 0°-signal V0_1 and second 0°-signal V0_2 form the input signals of arithmetic unit 100. First tilt-error signal VK1 is formed at the output of arithmetic unit 100. Using equation 1.1 and equation 2.1, it follows that:

$$V_{K1} = V0\_1 - V0\_2 = 2 \cdot V_{AC} \cdot \sin\left(\frac{\varphi}{2}\right) \cdot \cos(\alpha) \quad \text{(Equation 3.1)}$$

The use of two in-phase input signals is considered particularly advantageous, since in this case, the amplitude of first tilt-error signal VK1 is a function of the sine of angle of tilt $\phi$. This means that, given an angle of tilt $\phi=0°$, the amplitude of first tilt-error signal VK1 becomes 0. In addition, if first tilt-error signal VK1 is sign-dependent, positive values of angle of tilt $\phi$ lead to a positive value of the amplitude, negative values to a negative value of the amplitude. Moreover, in this case, first tilt-error signal VK1 may be evaluated particularly well, since given small angles of tilt $\phi$, its gradient is very great.

By forming the difference of the input signals, a further advantage results. In this regard, the DC voltage components $V_{DC}$ are eliminated, and further processing of first tilt-error signal VK1 is therefore simplified.

Example 2

Figure 3B:
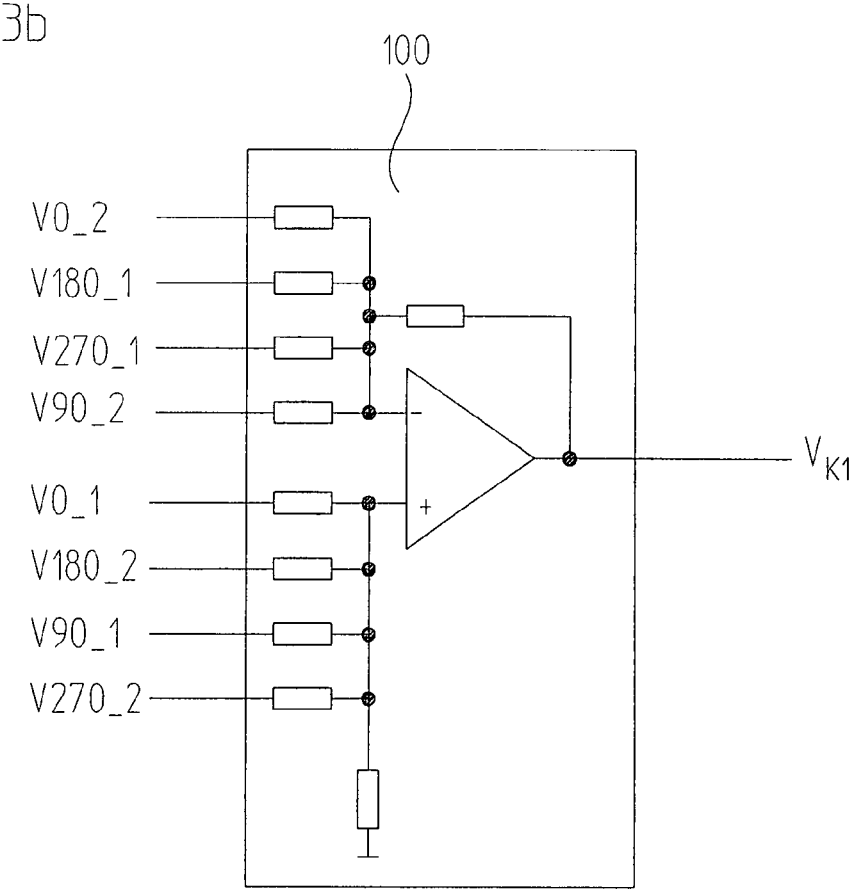
FIG. 3b illustrates an example embodiment of an arithmetic unit.

FIG. 3b illustrates an arrangement in principle of an arithmetic unit 100. In this case, it is a differential amplifier having eight inputs which, at the output, forms the difference between the sum of the four upper input signals and the sum of the four lower input signals. Differential amplifiers of this kind are also referred to as multiple subtractors. The four first position signals V0_1, V90_1, V180_1, V270_1 and the four second position signals V0_2, V90_2, V180_2, V270_2 are used for forming first tilt-error signal VK1. In this case, the following is yielded as result for first tilt-error signal VK1:

$$\begin{aligned}V_{K1} &= (V0\_1 + V180\_2 + V90\_1 + V270\_2) - \\ &\quad (V0\_2 + V180\_1 + V270\_1 + V90\_2) \\ &= \sqrt{2} \cdot 4 \cdot V_{AC} \cdot \sin\left(\frac{\varphi}{2}\right) \cdot \sin(\alpha + 45°)\end{aligned} \quad \text{(Equation 3.2)}$$

The same advantages are yielded as in Example 1. In this regard, the DC voltage component VDC is eliminated, since the difference is formed from an equal number of signals. Again, the change in amplitude of first tilt-error signal VK1 is dependent only on the sine of angle of tilt $\phi$. In addition, due to the considerably higher amplitude value compared to equation 3.1, a substantially greater first tilt-error signal VK1 results, which means its evaluation is further facilitated. Furthermore, by the use of the four first position signals V0_1, V90_1, V180_1, V270_1 and the four second position signals V0_2, V90_2, V180_2, V270_2, a signal averaging results which leads to a reduction of interference effects which can be included in individual signals.

First tilt-error signal VK1 is transmitted to the input of an evaluation unit 120 that ascertains tilt-error value VR from first tilt-error signal VK1. Depending on the form of evaluation unit 120, tilt-error value VR may be an analog or digital value. For example, analog tilt-error values VR may be ascertained by a peak-value detector, and digital values may be ascertained by an analog/digital converter.

Tilt-error value VR is fed to a processing unit 150 for further processing.

Figure 4:
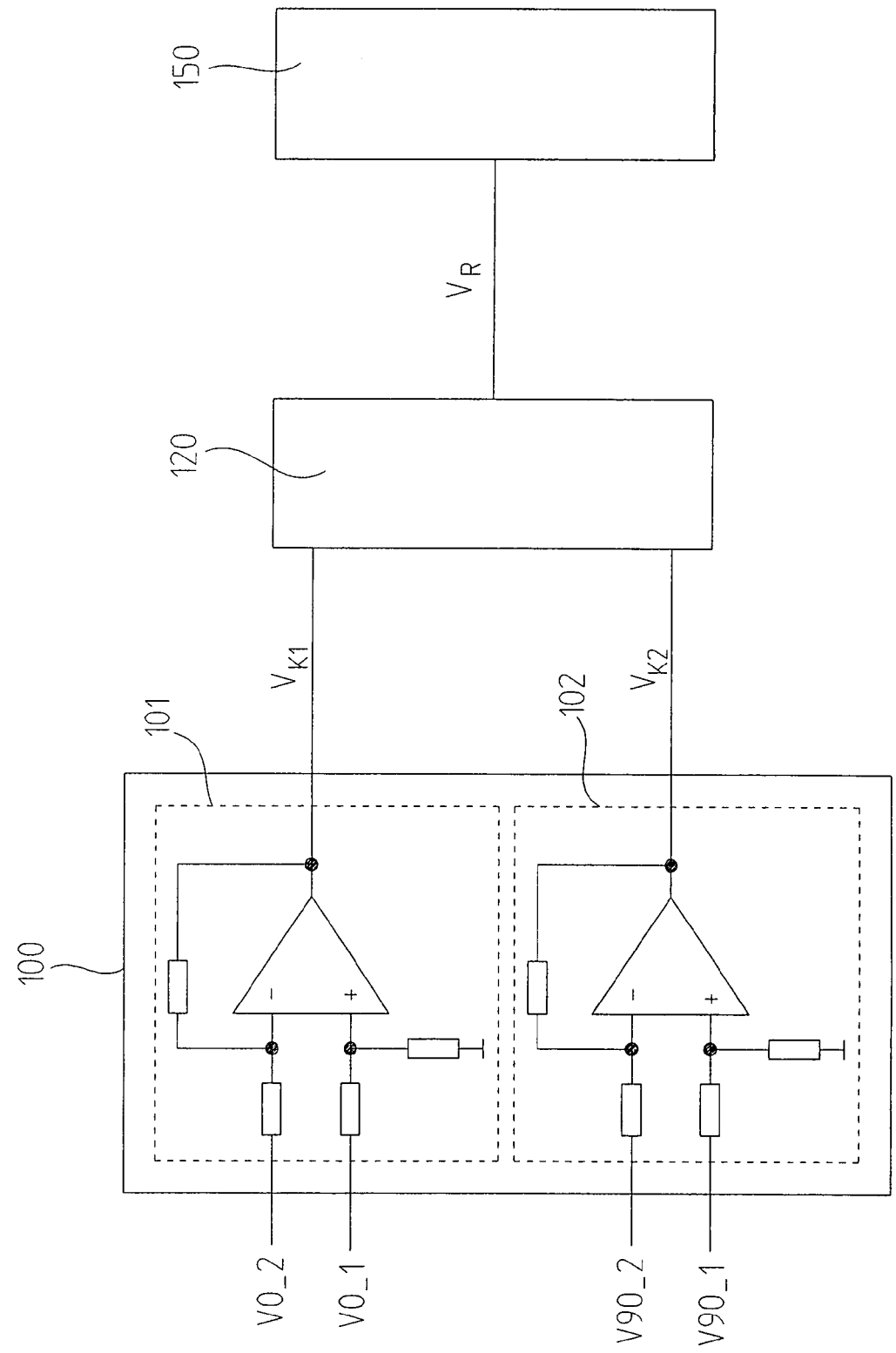
FIG. 4 is a simplified circuit diagram of a circuit configuration for ascertaining the tilt-error value.

A further example of a circuit configuration for ascertaining tilt-error value VR is illustrated in FIG. 4. In this example, arithmetic unit 100 includes a first differential amplifier 101 and a second differential amplifier 102. First differential amplifier 101 forms a first tilt-error signal VK1 from first 0°-signal V0_1 and second 0°-signal V0_2 according to equation 3.1. First 90°-signal V90_1 and second 90°-signal V90_2 are supplied to second differential amplifier 102. It generates a second tilt-error signal VK2 according to the following equation:

$$V_{K2} = V90\_1 - V90\_2 = 2 \cdot V_{AC} \cdot \sin\left(\frac{\varphi}{2}\right) \cdot \sin(\alpha) \quad \text{(Equation 4.1)}$$

First tilt-error signal VK1 and second tilt-error signal VK2 have the same amplitude and are out of phase by 90°. They may therefore be regarded as Cartesian coordinates of a complex position signal.

From first tilt-error signal VK1 and second tilt-error signal VK2, a tilt-error value VR may be determined in evaluation unit 120 by, for example, ascertaining the absolute value of the complex position signal:

$$V_R = \sqrt{(V_{K1})^2 + (V_{K2})^2} = 2 \cdot V_{AC} \cdot \sin\left(\frac{\varphi}{2}\right) \quad \text{(Equation 4.2)}$$

As illustrated in FIG. 2, tilt-error value VR is output to a processing unit 150 for further processing.

Figure 5:
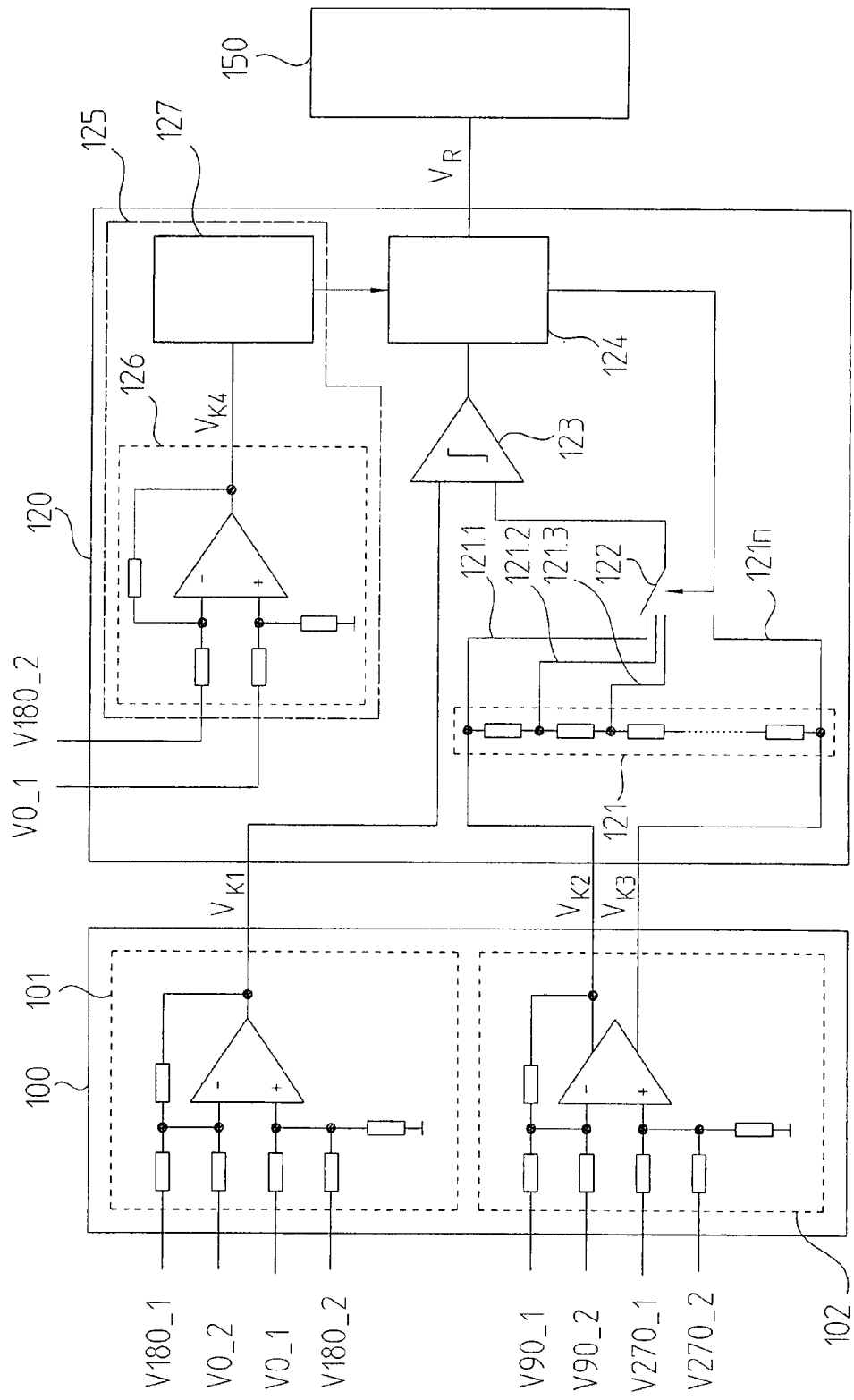
FIG. 5 is a simplified circuit diagram of a circuit configuration for ascertaining the tilt-error value.

FIG. 5 illustrates another example embodiment of a circuit configuration for ascertaining tilt-error value VR. From first 0°-signal V0_1, second 0°-signal V0_2, first 180°-signal V180_1 and second 180°-signal V180_2, a first tilt-error signal VK1 is generated in arithmetic unit 100 by a first differential amplifier 101 which has four inputs, according to the following equation:

$$V_{K1} = (V0\_1 + V180\_2) - (V0\_2 + V180\_1) \quad \text{(Equation 5.1)}$$
$$= 4 \cdot V_{AC} \cdot \sin\left(\frac{\varphi}{2}\right) \cdot \cos(\alpha)$$

Moreover, from first 90°-signal V90_1, second 90°-signal V90_2, first 270°-signal V270_1 and second 270°-signal V270_2, a second tilt-error signal VK2 and a third tilt-error signal VK3 are generated in a second differential amplifier 102. Second tilt-error signal VK2 may be described by the following equation:

$$V_{K2} = (V270\_1 + V270\_2) - (V90\_1 + V90\_2) \quad \text{(Equation 5.2)}$$
$$= 4 \cdot V_{AC} \cdot \cos\left(\frac{\varphi}{2}\right) \cdot \cos(\alpha)$$

Third tilt-error signal VK3 is the inverted second tilt-error signal VK2.

$$V_{K3} = -V_{K2} \quad \text{(Equation 5.3)}$$
$$= -4 \cdot V_{AC} \cdot \cos\left(\frac{\varphi}{2}\right) \cdot \cos(\alpha)$$

Tilt-error signals VK1, VK2 and VK3 are output to evaluation unit 120 for generating tilt-error value VR.

In this exemplary embodiment, evaluation unit 120 takes into account that, as a rule, amplitudes VAC of the position signals are temperature-dependent. To eliminate this temperature dependence, evaluation unit 120 forms the quotient of first tilt-error signal VK1 and second tilt-error signal VK2.

$$V_R = \frac{4 \cdot V_{AC} \cdot \sin\left(\frac{\varphi}{2}\right) \cdot \cos(\alpha)}{4 \cdot V_{AC} \cdot \cos\left(\frac{\varphi}{2}\right) \cdot \cos(\alpha)} \quad \text{(Equation 5.4)}$$
$$= \tan\left(\frac{\varphi}{2}\right)$$

First tilt-error signal VK1 and second tilt-error signal VK2 have the same phase angle. Since the amplitude of first tilt-error signal VK1 is a function of the sine of angle of tilt φ, but the amplitude of second tilt-error signal VK2 is a function of the cosine of angle of tilt φ, the dependence of tilt-error value VR on amplitude VAC, and therefore also its temperature dependence, does not apply, as apparent from equation 5.4. Moreover, the dependence of tilt-error value VR on phase value α also does not apply.

Located in evaluation unit 120 is a voltage divider 121, to whose outer terminals, second tilt-error signal VK2 and third tilt-error signal VK3 are applied. Voltage divider 121 has a plurality of taps 121.1, 121.2, 121.3, . . . , 121.n, of which in each case one is selectable by a switch element 122 and is switchable as a reference signal to a first input of a comparator 123. First tilt-error signal VK1 is applied to the second input of comparator 123. The output of comparator 123 determines the counting direction of a counter unit 124, whose counter reading first of all represents tilt-error value VR, and secondly is supplied to switch element 122 and determines which of taps 121.1, 121.2, 121.3, . . . , 121.n is switched to comparator 123. The selection of taps 121.1, 121.2, 121.3, . . . , 121.n is performed such that the reference signal approximates the amplitude of first tilt-error signal VK1.

A trigger unit 125 sends counting pulses to counter unit 124, which determine at what moments a counting operation is triggered, i.e., at what moments counter unit 124—as a function of the comparison of first tilt-error signal VK1 to the voltage at tap 121.1, 121.2, 121.3, . . . , 121.n of voltage divider 121 presently selected by switch element 122—counts upward or downward by one counting step. In order to achieve high accuracy of the comparison, it is considered to be particularly favorable to perform the comparison and the counting operation resulting therefrom at a moment at which first tilt-error signal VK1 has a large absolute value. As evident from equation 5.1, this is the case at a phase value α of 0° (positive maximum of first tilt-error signal VK1) or 180° (negative maximum of first tilt-error signal VK1).

In order to generate a counting pulse at one of these phase values α, trigger unit 125 makes use of the fact that, from first position signals V0_1, V90_1, V180_1, V270_1 and second position signals V0_2, V90_2, V180_2, V270_2, tilt-error signals may also be generated which are out of phase by 90° relative to first tilt-error signal VK1, and therefore have a zero crossing at the moment of a maximum or a minimum.

Trigger unit 125 contains a third differential amplifier 126, at whose inputs first 0°-signal V0_1 and second 180°-signal V180_2 are applied. At the output of third differential amplifier 126, a trigger signal VT is obtained according to the equation:

$$V_T = V0\_1 - V180\_2 \quad \text{(Equation 5.5)}$$
$$= 2 \cdot V_{AC} \cdot \cos\left(\frac{\varphi}{2}\right) \cdot \sin(\alpha)$$

The amplitude of trigger signal VT is a function of the cosine of angle of tilt φ. This is considered to be particularly advantageous, since in this case, even given very small angles of tilt φ, a large signal amplitude is available for evaluation. In addition, trigger signal VT is out of phase by 90° compared to first tilt-error signal VK1, thus it has zero crossings when first tilt-error signal VK1 reaches its positive or negative maximum. Trigger signal VT is applied to a zero-crossing detector 127 which, in response to a positive zero crossing, outputs a positive signal edge, and upon a negative zero crossing, outputs a negative signal edge. Which of the signal edges is used as counting pulse for counter unit 124 depends upon whether the maximum value or minimum value of first tilt-error signal VK1 is used for ascertaining tilt-error value VR.

It should be apparent that combinations of first position signals V0\_1, V90\_1, V180\_1, V270\_1 and second position signals V0\_2, V90\_2, V180\_2, V270\_2 other than those in the exemplary embodiments described may also be used for generating tilt-error signals VK1, VK2, VK3.

It should be appreciated that example embodiments of the present invention may be suitable both for linear measuring systems and for angular measuring systems.

What is claimed is:

1. A circuit configuration for ascertaining a tilt error in connection with a position-measuring device having at least one incremental track on a measuring graduation readable by a scanner,
   (a) the scanner movable relative to the measuring graduation in a measuring direction,
   (b) the scanner guidable along the measuring graduation,
   (c) the scanner rotated with respect to the measuring graduation by an angle of misalignment that is changeable during the relative movement,
   (d) the scanner including a first scanning region and a second scanning region spaced apart from each other in a direction perpendicular to the measuring direction,
   (e) upon reading the at least one incremental track, at least one first position signal is able to be generated by the first scanning region and at least one second position signal is able to be generated by the second scanning region, the circuit configuration comprising:
   an arithmetic unit configured to generate at least one tilt-error signal having an amplitude based on an angle of tilt that is a measure of the angle of misalignment, by addition and/or subtraction of the at least one first position signal and the at least one second position signal.

2. The circuit configuration according to claim 1, wherein the arithmetic unit includes at least one differential amplifier.

3. The circuit configuration according to claim 1, further comprising an evaluation unit configured to ascertain a tilt-error value that corresponds to the angle of misalignment from the at least one tilt-error signal.

4. The circuit configuration according to claim 3, wherein the arithmetic unit includes a first differential amplifier configured to form a first tilt-error signal and a second differential amplifier configured to form a second tilt-error signal.

5. The circuit configuration according to claim 4, wherein the first tilt-error signal and the second tilt-error signal have a phase shift of 90°, the evaluation unit configured to ascertain an absolute value of a complex position signal formed from the first tilt-error signal and the second tilt-error signal.

6. The circuit configuration according to claim 4, wherein the first tilt-error signal is a function of a sine of the angle of tilt, and the second tilt-error signal is a function of a cosine of the angle of tilt.

7. The circuit configuration according to claim 6, wherein the evaluation unit is configured to ascertain the tilt-error value as a quotient of the first tilt-error signal and the second tilt-error signal.

8. The circuit configuration according to claim 6, wherein the second differential amplifier is configured to generate a third tilt-error signal having a phase shift of 180° with respect to the second tilt-error signal.

9. The circuit configuration according to claim 7, wherein the evaluation unit includes a counter unit, a comparator and a trigger unit, the counter unit having an output corresponding to the tilt-error value, a counting direction of the counter unit determined in accordance with an output of the comparator, the first tilt-error signal and a reference signal applied to inputs of the comparator, the trigger unit configured to generate, at one of (a) a maximum and (b) a minimum of the first tilt-error signal, a counting pulse for the counter unit, in accordance with a counter reading of the counter unit, the reference signal being variable such that the reference signal and an amplitude of the first tilt-error signal come close to each other.

10. The circuit configuration according to claim 9, wherein the evaluation unit includes a voltage divider, having a plurality of taps, and a switch element, the second tilt-error signal and the third tilt-error signal applied to outer terminals of the voltage divider, one of the taps being switchable by the switch element as a reference signal to the comparator, the counter reading of the counter unit supplied to the switch element for selection of the tap.

11. The circuit configuration according to claim 9, wherein the trigger unit includes a third differential amplifier and a zero-crossing detector, the third differential amplifier configured to generate, from at least one first position signal and at least one second position signal, a trigger signal that is out of phase by 90° compared to the first tilt-error signal, the trigger signal supplied to the zero-crossing detector that, at one of (a) a positive and (b) a negative zero crossing of the trigger signal, is configured to output a counting pulse to the counter unit.

12. A position-measurement device, comprising:
   a measuring graduation including at least one incremental track;
   a scanner: (a) configured to read the incremental track; (b) movable relative to the measuring graduation in a measurement direction; (c) being guided along the measuring graduation and being rotated with respect to the measuring graduation by an angle of misalignment that is changeable during the relative movement; and (d) having a first scanning region and a second scanning region spaced apart from each other in a direction perpendicular to the measuring direction; upon reading the at least one incremental track, at least one first position signal is able to be generated by the first scanning region and at least one second position signal is able to be generated by the second scanning region; and
   a circuit configuration configured to ascertain a tilt error, the circuit configuration including an arithmetic unit, the at least one first position signal and the at least one second position signal supplied to the arithmetic unit, the arithmetic unit configured to generate, from the at least one first position signal and from the at least one second position signal, by at least one of (a) addition and (b) subtraction operations at least one tilt-error signal having an amplitude determined in accordance with an angle of tilt that is a measure of the angle of misalignment.

13. A method for ascertaining a tilt error in connection with a position-measuring device having at least one incremental track on a measuring graduation that is readable by a scanner, which is movable relative to the measuring graduation in a measuring direction, the scanner guidable along the measuring graduation, the scanner rotated with respect to the measuring graduation by an angle of misalignment that is changeable during the relative movement, the scanner having a first scanning region and a second scanning region spaced apart from each other in a direction perpendicular to the measuring direction, comprising:

upon reading the at least one incremental track, generating at least one first position signal by the first scanning region and generating at least one second position signal by the second scanning region; and generating, from the at least one first position signal and the at least one second position signal, at least one tilt-error signal by at least one of (a) addition and (b) subtraction operations in an arithmetic unit, an amplitude of the tilt-error signal determined by an angle of tilt that is a measure of the angle of misalignment.

14. The method according to claim 13, wherein the at least one tilt-error signal is generated by at least one differential amplifier.

15. The method according to claim 13, further comprising ascertaining, in an evaluation unit, a tilt-error value, from the at least one tilt-error signal, that corresponds to the angle of misalignment.

16. The method according to claim 13, wherein the tilt-error signal generating step includes generating, in the arithmetic unit, a first tilt-error signal by a first differential amplifier and a second tilt-error signal by a second differential amplifier.

17. The method according to claim 16, wherein the first tilt-error signal and the second tilt-error signal have a phase shift of 90°, the method further comprising ascertaining, in the evaluation unit, an absolute value of a complex position signal formed from the first tilt-error signal and the second tilt-error signal as a tilt-error value.

18. The method according to claim 16, wherein the first tilt-error signal is a function of a sine of the angle of tilt and the second tilt-error signal is a function of a cosine of the angle of tilt, the method further comprising forming, in the evaluation unit, a quotient of the first tilt-error signal and the second tilt-error signal for ascertaining a tilt-error value.

19. The method according to claim 18, further comprising:
establishing, in a comparison of the first tilt-error signal to a reference signal in a comparator, a counting direction of a counter unit, a counter reading of the counter unit being the tilt-error value;

sending a counting pulse to the counter unit by a trigger unit at one of (a) a maximum and (b) minimum of the first tilt-error signal; and changing the reference signal, in accordance with the counter reading of the counter unit, such that the reference signal and an amplitude of the first tilt-error signal come close to each other.

20. The method according to claim 19, further comprising:
forming, in the arithmetic unit, a third tilt-error signal having a phase shift of 180° relative to the second tilt-error signal;

applying, in the evaluation unit, the second tilt-error signal and the third tilt-error signal to outer terminals of a voltage divider having a plurality of taps, one of the taps being switchable by a switch element as a reference signal to the comparator; and supplying the counter reading of the counter unit to the switch element for selection of the tap.

21. The method according to claim 19, further comprising:
generating a trigger signal, by a third differential amplifier in the trigger unit, from at least one first position signal and at least one second position signal, the trigger signal out of phase by 90° with respect to the first tilt-error signal; and supplying the trigger signal to a zero-crossing detector that, at one of (a) a positive and (b) a negative zero crossing of the trigger signal, outputs a counting pulse to the counter unit.

22. The circuit configuration according to claim 1, wherein the incremental track is arranged in a scale plane, and the angle of tilt corresponds to a rotational angle about an axis that extends perpendicular to the scale plane.

23. The position-measurement device according to claim 12, wherein the incremental track is arranged in a scale plane, and the angle of tilt corresponds to a rotational angle about an axis that extends perpendicular to the scale plane.

24. The method according to claim 13, wherein the incremental track is arranged in a scale plane, and the angle of tilt corresponds to a rotational angle about an axis that extends perpendicular to the scale plane.

* * * * *